Feb. 7, 1933. A. H. WELLENSIEK 1,896,118
AUXILIARY JACK LIFT AND TRUCK MECHANISM FOR MOTOR VEHICLES
Filed April 14, 1928 2 Sheets-Sheet 1
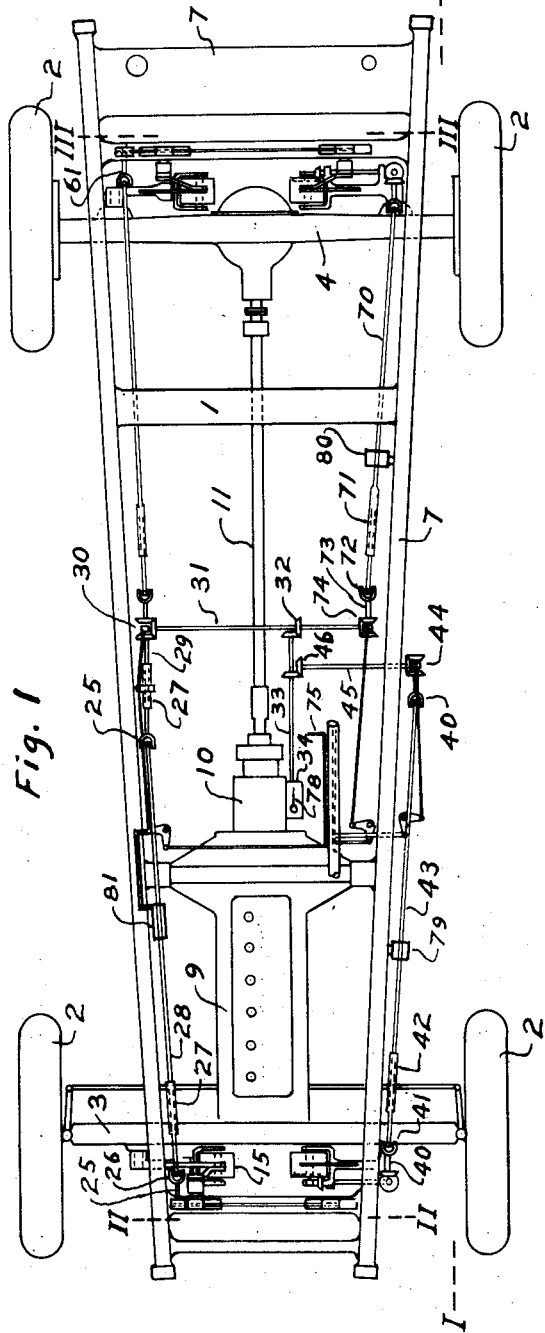

Feb. 7, 1933. A. H. WELLENSIEK 1,896,118
AUXILIARY JACK LIFT AND TRUCK MECHANISM FOR MOTOR VEHICLES
Filed April 14, 1928 2 Sheets-Sheet 2
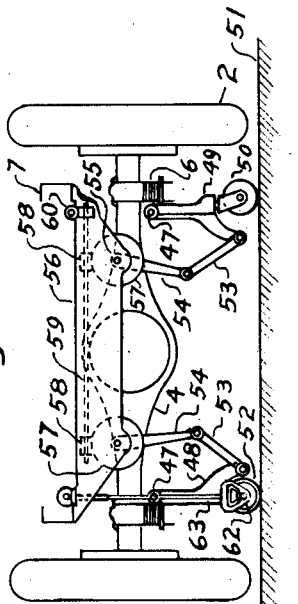
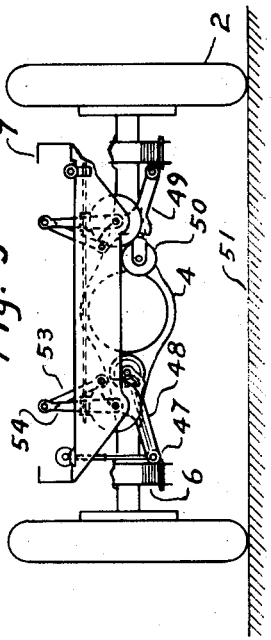
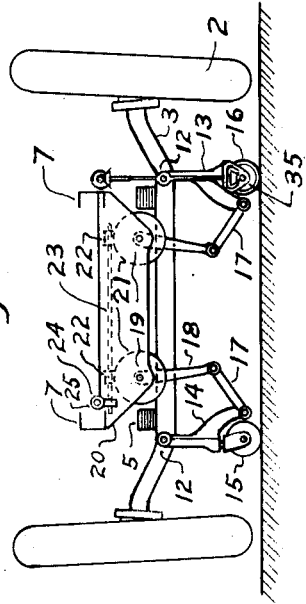
Inventor
Adolph H. Wellensiek.
Witnesses Patented Feb. 7, 1933

1,896,118

UNITED STATES PATENT OFFICE

ADOLPH H. WELLENSIEK, OF WASHINGTON, DISTRICT OF COLUMBIA

AUXILIARY JACK LIFT AND TRUCK MECHANISM FOR MOTOR VEHICLES

Application filed April 14, 1928. Serial No. 270,042.

My invention relates to motor vehicles and particularly to auxiliary lifting jack and truck mechanism attachable to or constructed into motor vehicles for use in lifting same and moving same laterally or turning same about a vertical axis, thus providing suitable means for turning or packing a motor vehicle in a congested district, or for quickly elevating the vehicle for purposes of making repairs, changing tires, etc.

It is recognized that lifting, turning and lateral motion devices for motor vehicles have been previously invented and patented under title of Automobile parking device, jack and shifter, etc., but no previous invention embodies the mechanical system, manner of attachment or construction, method of support and method of control such as is claimed for the mechanism herein described.

My invention embodies certain mechanical improvements not found in prior inventions of lifting, parking and turning devices for motor vehicles. One of said improvements pertains to the manner of mounting the parking device onto the motor vehicle. It is desirable to have the unsprung weight of a motor vehicle as light as possible, hence any accessories or extra equipment added to a motor vehicle should be supported as much as possible by the springs when the vehicle is traveling on the road in regular service. Any lifting mechanism for elevating said motor vehicle from the ground should however bear on the unsprung portion of the motor vehicle in order to minimize the lifting distance and to support firmly the vehicle entirely off from the ground.

The principal object of my invention is to provide an improved device attachable to or constructed into a motor vehicle by means of which said vehicle may be jacked up off from the ground on to rigid portable standards bearing firmly on the unsprung portion of the vehicle and by means of which the vehicle may be carried laterally or turned around, and when said standards are raised and in non-supporting position, they are so carried that most of their weight together with the entire weight of the power operating mechanism for same is carried by that portion of the motor vehicle which is supported by the springs. In other words, my invention provides for a lifting device attached to a motor vehicle in such a manner that only a small portion of its weight, if any, will be carried as unsprung weight when the jack is carried in non-operating position, while on the other hand when the jack is lowered into operating position it will support firmly the running gear of the motor vehicle off from the ground.

Another object of my invention is to provide means for propulsion of the motor vehicle while supported by the lifting jack whereby the vehicle may be moved laterally either to right or to left, or whereby the vehicle may be turned around by moving only one end laterally, or whereby it may be turned around by moving one end in one direction and the other end in the opposite direction thus turning it about a vertical axis at a point nearer the center of said vehicle.

Another object of my invention is to provide means for convenient power take-off from the power transmission system of the motor vehicle for purposes of lifting, of lateral propulsion, and for turning said motor vehicle.

Another object of my invention is to provide means for convenient control of the various movements described above by suitable connecting and disconnecting devices in the power distribution system controlled by suitable levers, interlocking switches and automatic safety stops or cutouts.

The mechanism herein described includes four standards or lifting members to support a motor vehicle at four points, each point being close to one of the road wheels. It would of course be possible to use a three point suspension system and use only three standards instead of four, thus using only one at one end or the other of the vehicle, but it appears more practical to use four standards as herein shown. The number of standards to be used is immaterial so far as the patent is concerned for it is easily seen that a six-wheel, three-axle truck would require at least four standards, and perhaps six standards would be more practical.

The jack lift and auxiliary truck mechanism may be operated either manually or by power supplied from the engine of the motor vehicle. In the case of manual operation, a crank with suitable extension rod and coupling may be attached to the driving mechanisms of the auxiliary truck at points convenient for the particular motion desired. In the case of operation by power from the engine a suitable power take-off is provided from the transmission gear of the motor vehicle together with the gear shift and clutches and control levers so arranged that the jack lift and auxiliary truck mechanism may be operated from the regular station for the driver of the motor vehicle. Automatic safety stops and brake mechanism is also provided for in connection with the driving and control system.

In this specification and the annexed drawings, I disclose my invention in the form which I consider the best, but I do not limit my invention to such form as it may be embodied in other forms, and it is to be understood that in and by the claims following the description herein, I intend to cover my invention in whatever form it may be embodied.

Referring to the drawings:

Figure 1 is a plan view of the chassis of a motor vehicle equipped with the preferred form of my invention. The jack lift standards are therein shown in raised or non-operating position.

Figure 2 is a cross-sectional side elevation taken on the line I—I of Fig. 1, showing however the jack lift standards in lowered or operating position with the vehicle proper entirely off from the ground.

Figure 3 and Figure 4 show front and rear elevations respectively of a motor vehicle chassis equipped with the preferred form of my invention. The end of frame and springs are shown cut away to the lines II—II and III—III in Fig. 1. The jack lift standards are therein shown in lowered or operating position with the vehicle proper entirely off the ground.

Figure 5 is a rear view elevation of the same combination shown in Fig. 4 except that the jack lift standards are shown in raised or non-operating position.

The motor vehicle which is illustrated is merely typical of the class of such conveyances to which the invention may be applied and serves to show one adaptation of the preferred form of the invention, it being clear that various changes in the shape and relation of parts constituting the embodiment of the inventive idea may be availed of in order to adapt such idea to different vehicles.

In the drawings, 1 indicates the chassis of the motor vehicle the major parts of which are the wheels 2, the front axle 3, the rear axle 4, the front springs 5, the rear springs 6, the main frame 7, the steering wheel 8, the engine 9, the transmission 10, and the drive shaft 11, respectively.

Pivotally attached to the front axle 3 at points 12, shown in Fig. 3, near the springs 5, are lifting standards 13 and 14 respectively. Standard 14 is fitted with caster 15, and standard 13 is fitted with traction roller 16. Standards 13 and 14 are operably attached by links 17 to tilting gear arms 18 fixed on shafts 19. Shafts 19 are supported by a combination gear housing and bracket 20 attached firmly to the main frame 7 of the motor vehicle.

Mounted on to the shafts 19 are worm gears 21, driven by worms 22, mounted on shaft 23, which is supported by gear housing 20. Shaft 23 is driven by spiral gears 24 from shaft 25.

Referring to Fig. 1, shaft 25 is extended by universal joints 26, sliding joints 27, shafts 28 and 29 to combination double jaw clutch between bevelled gearing set 30, which in turn is driven by shaft 31, bevel gears 32, shaft 33 from power take-off 34 geared to the main power transmission 10 of the motor vehicle.

Referring to Figures 3 and 2, the traction wheel 16 is fitted with bevel gear set 35, driven in turn by shaft 36, (Fig. 2), universal joint 37, sliding joint 38, mitre-gear set 39, shaft 40, universal joints 41, sliding joint 42, (Fig. 1), shaft 43, to combination double jaw clutch between bevel gearing set 44, thence by shaft 45, mitre gear set 46, shaft 33 to power take-off 34.

Pivotally attached to the rear axle 4 at points 47 near the springs 6 are lifting standards 48 and 49 respectively. Standard 49 is fitted with a caster 50 which bears on the ground 51 when in lowered or operating position. Standard 48 is fitted with traction roller 52 which is similar to traction roller 16 on one of the front axle standards. Standards 48 and 49 are operably attached by links 53 to tilting gear arms 54 mounted on shafts 55. Shafts 55 are supported by combination gear housing and bracket 56 attached firmly to the main frame 7 of the motor vehicle.

Mounted on the shafts 55 are worm gears 57 driven by worms 58 mounted on shaft 59 which is supported by the gear housing 56. Shaft 59 is driven by spiral gear 60 from shaft 61 (Fig. 1), which in turn is connected by flexible joints and shaft extensions to the combination double jaw clutch between bevel gear set 30. The front and rear tilting gears are thus both operated through gear set 30 which in turn is geared through shafts 31 and 33 to the power take-off 34. The shaft 29 extends through the nest of bevel gears 30 and forms the central connecting shaft between the power transmission to the front and rear tilting or lifting gear sets. The double clutch between the bevel gearing nest 30 may embody either a sliding jaw or friction contact. The purpose of this clutch and bevel gear nest is to form a reversible gear connection between shafts 31 and 29.

The traction roller 52 (Fig. 4) is geared by bevel gear set 62 to shaft 63 which is extended through universal joint 64 (Fig. 2), shaft 65, sliding joint 66, mitre gear set 67, shaft 68, universal joint 69, shaft 70, sliding joint 71, universal joint 72, shaft 73, to combination double clutch between bevel gearing set 74, thence by shaft 31 (Fig. 1), mitre gear set 32, shaft 33 to power take-off 34.

The combination double clutches between bevel gear nests 30, 44, and 74 (Fig. 1) are all of similar construction and the purpose of them is to provide reversible power drive to the lifting mechanisms and the traction rollers described above.

The shifting lever of double clutch 30 is connected by extension rods and bell cranks to lever 75 (Fig. 1) which is within convenient reach of the operator when at his station at the steering wheel 8 of the motor vehicle. The shifting levers of double clutches 44 and 74 are similarly extended by rods and cranks to levers 76 and 77 respectively (Fig. 2) which are within convenient reach of the operator when at his station at the steering wheel 8 of the motor vehicle.

The power take-off 34 is connected and disconnected with the motor vehicle transmission 10 by lever 78 extended to convenient reach of the operator of the vehicle.

The main clutch between the engine 9 and the transmission 10 of the motor vehicle is operated when connecting or disconnecting the power take-off 34 with the transmission 10 of the motor vehicle.

The control levers 75, 76, 77 and 78 are separately interlocked with the main control levers of the motor vehicle so that it is impossible to transmit power drive motion simultaneously to the various operation units except those units that may be operated safely at the same time. The interlocking mechanism prevents connection of the power take-off 34 to the transmission 10 except when the main gear shift lever of the motor vehicle is in neutral position. The interlocking mechanism also prevents transmission of power drive motion to the jack lifting units while the drive shaft 11 of the motor vehicle is in motion. The interlocking mechanism furthermore prevents transmission of power drive motion to traction rollers 16 and 52 except when the jack lift standards are in lowered or vertical position, and lever 75 is in neutral position.

The power transmission shafts 43 and 70 (Fig. 1) on the power line to the traction rollers are each provided with a brake drum at 79 and 80 respectively which revolve with-in brake bands anchored to the main frame 7, and are controlled by levers which are extended to the control station of the motor vehicle operator, or attached to the motor vehicle foot brake lever.

The power transmission shaft 28 (Fig. 1) on the power line to the jack lifting mechanisms, or an extended section of same, is geared to a movable lever trip mechanism 81 which automatically disengages the clutch in the bevel gear set 30 when the jack lift standards arrive at the vertical position in lifting the vehicle or when the said jack lift standards arrive at the horizontally carrying position.

The auxiliary jack lift and truck mechanism thus described will lift the motor vehicle only when it has come to full stop. The lifting gears are automatically disengaged from the power drive when the lifting standards have been forced down into vertical position and have lifted the vehicle off from the ground. The traction rollers may be driven from the engine only when the jack lift standards are in vertical position with the road wheels off the ground, and thus carry the vehicle laterally in either direction or turn it around.

It will be understood that my invention is not limited to the details of construction described above as these may be varied without departing from essential features of the invention.

Having described my invention, I claim as new and desire to secure by Letters Patent:

1. In a motor vehicle, a spring mounted main frame, a lifting and parking mechanism with lifting standards pivotally attached by one end to the unsprung portion of said motor vehicle and each connected by another point to a power driven tilting mechanism for moving the standards into position of lifting the vehicle off the ground, which tilting mechanism is attached to the spring mounted portion of said motor vehicle; a ground wheel fitted to each lifting standard; means for selectively connecting and disconnecting said power driven tilting gears and one or more of said ground wheels to the power system of said motor vehicle; means for reversing direction of operation of said tilting gears and ground wheels, and means for control in operating said lifting and parking mechanism from the operator's station on the motor vehicle.

2. In a motor vehicle, a spring mounted main frame, a power plant including drive shaft, a clutch, a selective power transmission gear system for regularly operating said motor vehicle; swinging jacks so attached to said motor vehicle that when elevated and not in actual use they are carried partly by the frame and partly by the axles; ground wheels attached to said jacks; actuating means for swinging said jacks into position of lifting the motor vehicle; actuating means for operating said jack wheels to move either end of said motor vehicle sidewise in either direction independently of the motion of the other end.

3. The combination with a motor vehicle of a geared lifting and parking device having a plurality of jack lift standards each fitted with ground wheels and pivotally attached to the unsprung portion of the motor vehicle but supported in position by linking to tilting mechanism, which tilting mechanism is mounted on the spring supported portion of said motor vehicle and supports the heaviest end of the jack lift standards when in non-operating positions; means for selectively connecting and disconnecting the gearing of the lifting and parking units to the power system of said motor vehicle; means for selectively controlling the direction of motion of said lifting and parking units so that either end of the vehicle may be moved sidewise independent of direction of motion of the other end.

4. The combination with a motor vehicle of extensible jacks equipped with ground wheels; actuating means for raising said jacks into non-operating position so that the major portion of the weight of said jack is supported by the spring mounted portion of said motor vehicle; actuating means for lowering said jack into position to lift and support the motor vehicle from the ground by bearing against the unsprung portion of said motor vehicle; other actuating means for driving the ground wheels in one direction and the other, the last mentioned actuating means being separable from the first actuating means; means for operating the ground wheels so as to move either end of the vehicle laterally independent of the other end, and lever controls for said lifting and lateral motion means.

5. The combination with a motor vehicle of a lifting and parking mechanism equipped with ground wheels, one of the said ground wheels at each end of said motor vehicle being geared for connection to the power system, whereas the remaining ground wheel or wheels are swiveled or mounted in casters so as to allow same to follow a circular motion on the ground to facilitate lateral movement of one end of the motor vehicle independent of the other end.

6. The combination with a motor vehicle of a lifting and parking mechanism equipped with two power geared ground wheels and auxiliary support on casters to facilitate turning motion of said vehicle; means for driving either one of the geared ground wheels independently of the other to turn the vehicle.

7. The combination with a motor vehicle of a lifting and parking mechanism equipped with power geared ground wheels and casters to permit one end of the vehicle to be moved in one direction while the other end is being moved in the other direction and means for turning the vehicle.

8. The combination with a motor vehicle of tractor and trailer lifting jacks carried thereby, brakes for stopping lateral movement of the vehicle when supported upon said jacks, and the trailer jacks fitted with castors to facilitate turning motion of said motor vehicle.

9. The combination with a motor vehicle of lifting tractor and trailer jacks carried thereby and said tractor jacks operably connected to the power system and said trailer jacks equipped with caster wheels to permit one end of the vehicle to be moved in one direction while the other end is being moved in the opposite direction; means for moving the jacks to raise the motor vehicle bodily; means to move the motor vehicle sidewise when raised and supported by said jacks; and operating levers controlling said movements.

10. The combination with a motor vehicle of tractor and trailer lifting jacks pivotally mounted on the unsprung portion of the said vehicle and operated by power tilting mechanism attached to the spring mounted portion of said vehicle; means for automatically disconnecting the power transmission to the tilting mechanism when the desired limit of motion of the jacks is reached, and the trailer jacks fitted with casters to permit one end of the vehicle to be moved in one direction while the other end is being moved in the opposite direction.

11. The combination with a motor vehicle of lifting tractor and trailer jacks operably attached to said vehicle for lifting, turning and moving same sidewise; brakes for controlling separately the lateral motion of either end of the vehicle when supported upon said jacks, and caster supports on the trailer jacks to facilitate turning the vehicle.

12. The combination with a motor vehicle of tractor and trailer lifting jacks operably attached thereto for lifting and moving the vehicle sidewise; means for substantially supporting said lifting jacks when in non-operating position from the spring mounted part of said vehicle so that the ends of the jack standards are partly counter-balanced by said supporting means, and a hinged steady-rest at one end of said lifting jack standards supported by the unsprung portion of said vehicle.

In testimony whereof I affix my signature.

ADOLPH H. WELLENSIEK.